Jan. 26, 1932.  H. R. STEVENS ET AL  1,843,049
BELT DRESSING HOLDER
Filed July 3, 1930
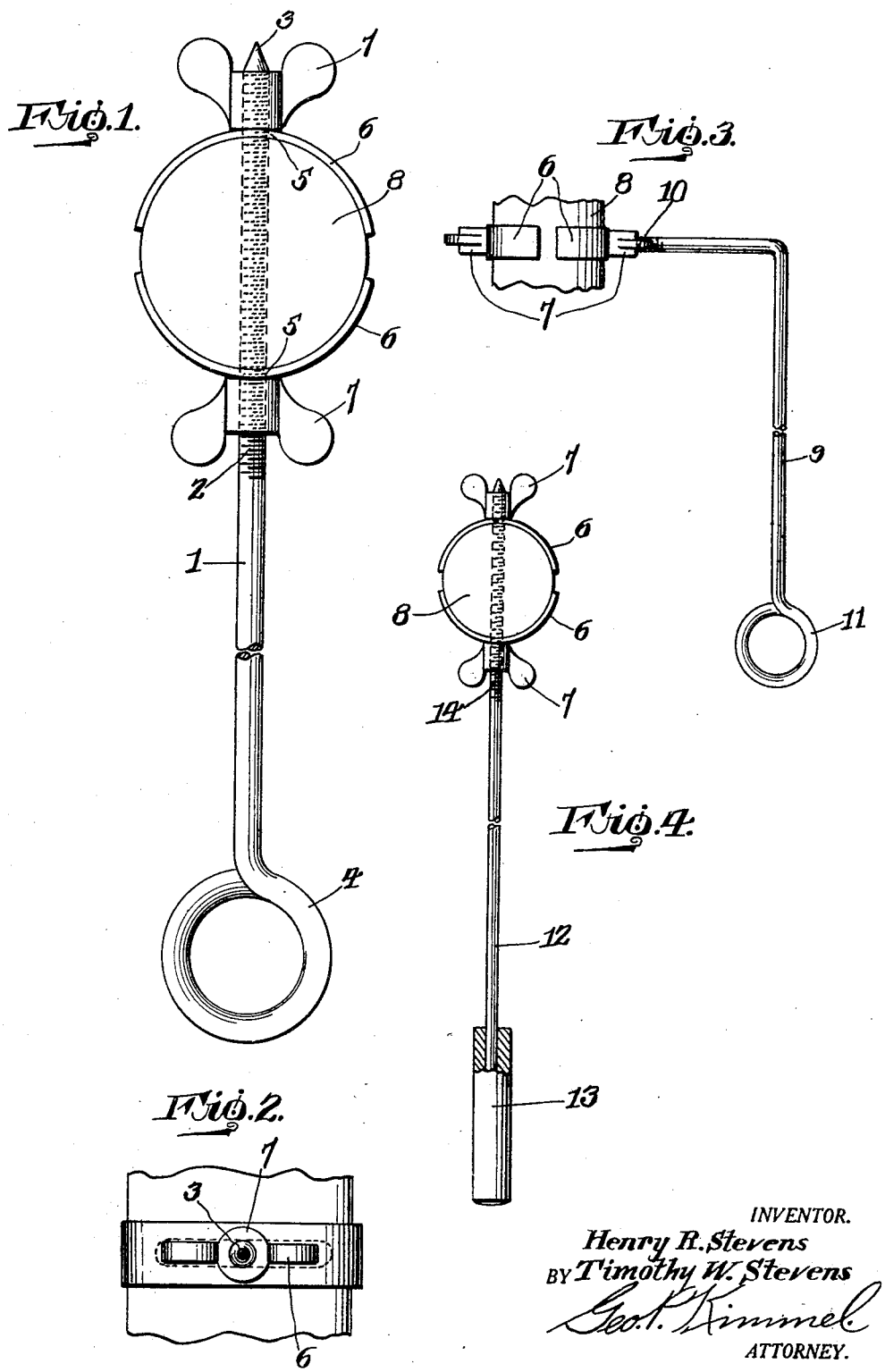
INVENTOR.
Henry R. Stevens
BY Timothy W. Stevens
Geo. F. Kimmel
ATTORNEY.

Patented Jan. 26, 1932

1,843,049

UNITED STATES PATENT OFFICE

HENRY R. STEVENS AND TIMOTHY W. STEVENS, OF ASHTABULA, OHIO

BELT DRESSING HOLDER

Application filed July 3, 1930. Serial No. 465,684.

This invention relates to a belt dressing holder and has for its primary object to provide, in a manner as hereinafter set forth, a holder of such class by means of which belt dressing may be conveniently and advantageously applied to a belt without the necessity of touching the belt with the hand, thereby eliminating the likelihood of injury to the hands by having the same drawn between the belt and mounting therefor.

With the foregoing and other objects in view, the invention consists of the novel construction, combination and arrangement of parts as hereinafter more particularly described, and as illustrated in the accompanying drawings wherein are shown embodiments of the invention, but it is to be understood that the description and drawings are to be taken as illustrative and that the invention is intended to be limited only by the scope of the claim hereunto appended.

In the accompanying drawings in which like numerals are employed to designate like parts throughout the several views:—

Figure 1 is an elevation of a holder in accordance with this invention showing the same in applied position with respect to a block of belt dressing.

Figure 2 is a fragmentary top plan of the embodiment shown in Figure 1.

Figure 3 is a reduced elevation of a slightly modified form of the invention.

Figure 4 is a reduced elevation similar to Figure 1 showing a modified form of handle member.

Referring to the drawings in detail, the numeral 1 indicates a rod having an externally threaded end portion 2 terminating at its free end in a tapered point 3. At the opposite end thereof, the rod 1 is bent into the form of an eye to provide a handle member 4.

The threaded portion 2 of the rod is loosely extended through openings 5 in a pair of oppositely disposed, arcuate clamping plates 6, and engaging the convex faces of the plates 6 are a pair of wing nuts 7 which are threaded onto the portion 2 of the rod 1.

In the use of the holder, the innermost nut 7 and plate 6 is positioned on the rod 1, after which the point 3 is inserted into a block of dressing, such as 8, and the rod is then rotated to extend the portion 2 thereof diametrically through the block 8. The outermost plate 6 and nut 7 are then positioned on the rod 1, after which the nuts 7 are moved toward each other to bring the plates 6 into position to embrace the block 8 and to clamp the latter between the plates. An end face of the block 8 then may be applied to a belt or the like by grasping the holder by the handle member 4.

The embodiment shown in Figure 3 is the same as that above described except that the rod 9 is bent intermediate its ends to project the threaded portion 10 thereof at a right angle to the longitudinal plane of the portion of the rod 9 on which the handle member 11 is formed. The threaded portion 10 is provided with plates 6 and wing nuts 7 identical with those described in connection with the embodiment shown in Figure 1. This form of the holder is particularly adaptable for use in applying a dressing to a belt located above the head of the user of the holder.

The embodiment shown in Figure 4 is the same as that above described in connection with Figure 1 except that the rod 12 is provided with an elongated handle member 13, preferably formed of wood, such handle member being located at the opposite end of the rod 12 from the threaded portion 14 of the latter. The threaded portion 14 is provided with plates 6 and wing nuts 7 identical with those previously described.

It is thought that the many advantages of a holder in accordance with this invention will be readily apparent, and although the holder preferably will be constructed in accordance with one of the embodiments herein illustrated and described, it is to be understood that changes in the details of construction may be resorted to, so long as such changes fall within the scope of the invention as defined in the appended claims.

What we claim is:—

1. A belt dressing holder comprising, a rod for insertion through the dressing, and clamps independently adjustable longitudinally of the rod for engagement with the peripheral face of the dressing to maintain the latter in position on the rod.

2. A belt dressing holder comprising, a rod having an externally threaded end terminal portion terminating in a tapered point for insertion through the dressing, and clamps independently adjustable longitudinally of the threaded portion for engagement with the peripheral face of the dressing to maintain the latter in position on the threaded portion.

3. A belt dressing holder comprising, a rod having an externally threaded end terminal portion for insertion through the dressing, a pair of oppositely disposed, spaced arcuate clamping plates provided with openings through which said threaded portion extends, and a pair of spaced nuts threaded on the threaded portion and engaging the convex faces of the arcuate plates for maintaining the latter in engagement with the peripheral face of the dressing.

4. A belt dressing holder comprising, a rod having an externally threaded end terminal portion for insertion through the dressing, a pair of oppositely disposed, spaced arcuate clamping plates provided with openings through which said threaded portion extends, and a pair of nuts threaded on the threaded portion and engaging the convex faces of the arcuate plates for maintaining the latter in engagement with the peripheral face of the dressing, said threaded portion terminating at its free end in a tapered point, said rod being formed at the end thereof opposite the threaded portion with a handle member.

5. In a holder for a cylindrical block of belt dressing, a rod having an externally threaded end terminal portion for extension through the block of dressing diametrically of the block, said threaded portion terminating at its free end in a tapered point, a pair of spaced clamping plates for disposition on opposite sides of the dressing and having the threaded portion of the rod loosely extended therethrough, and means threaded on said threaded portion for abutment with the convex faces of the plates to hold the latter in embracing position with respect to the block of dressing.

6. A portable belt dressing holder comprising a rod having a threaded portion upon which the block of dressing is secured, a pair of spaced clamping plates mounted on said portion and between which the dressing is positioned, and a pair of holding nuts mounted on and threadedly engaging with said portion, adjustable relatively to each other and each coacting with a plate to arrest the shifting of the dressing lengthwise of the rod.

7. A portable belt dressing holder comprising a rod having a threaded portion upon which the block of dressing is secured, a pair of spaced clamping plates mounted on said portion and between which the dressing is positioned, a pair of holding nuts mounted on and threadedly engaging with said portion, adjustable relatively to each other and each coacting with a plate to arrest the shifting of the dressing lengthwise of the rod, and said threaded portion having a pointed end to facilitate its entry into the block of dressing.

8. A portable holder for a block of belt dressing comprising a rod for extension through the block and having a threaded part for securing the block thereon, and means adjustable lengthwise of said rod, threadedly engaging with said part and binding at opposite sides of the block to prevent the shifting of the latter on said threaded part.

9. A portable holder for a block of belt dressing comprising a rod for extension through the block and having a threaded part for securing the block thereon, means adjustable lengthwise of said rod, threadedly engaging with said part and binding at opposite sides of the block to prevent the shifting of the latter on said threaded part, and said rod having a pointed end to facilitate the entrance of the rod in said block.

10. A portable holder for a block of belt dressing comprising a rod for extension through the block and having a threaded part for securing the block thereon, means adjustable lengthwise of said rod, threadedly engaging with said part and binding at opposite sides of the block to prevent the shifting of the latter on said threaded part, and said rod having a handle member spaced from said part.

11. A portable holder for a block of belt dressing comprising a rod for extension through the block and having a threaded part for securing the block thereon, means adjustable lengthwise of said rod, threadedly engaging with said part and binding at opposite sides of the block to prevent the shifting of the latter on said threaded part, said rod having a pointed end to facilitate the entrance of the rod in said block, and said rod having a handle member at that end opposite said pointed end.

In testimony whereof, we affix our signatures hereto.

HENRY R. STEVENS.
TIMOTHY W. STEVENS.